United States Patent Office 2,989,034
Patented June 20, 1961

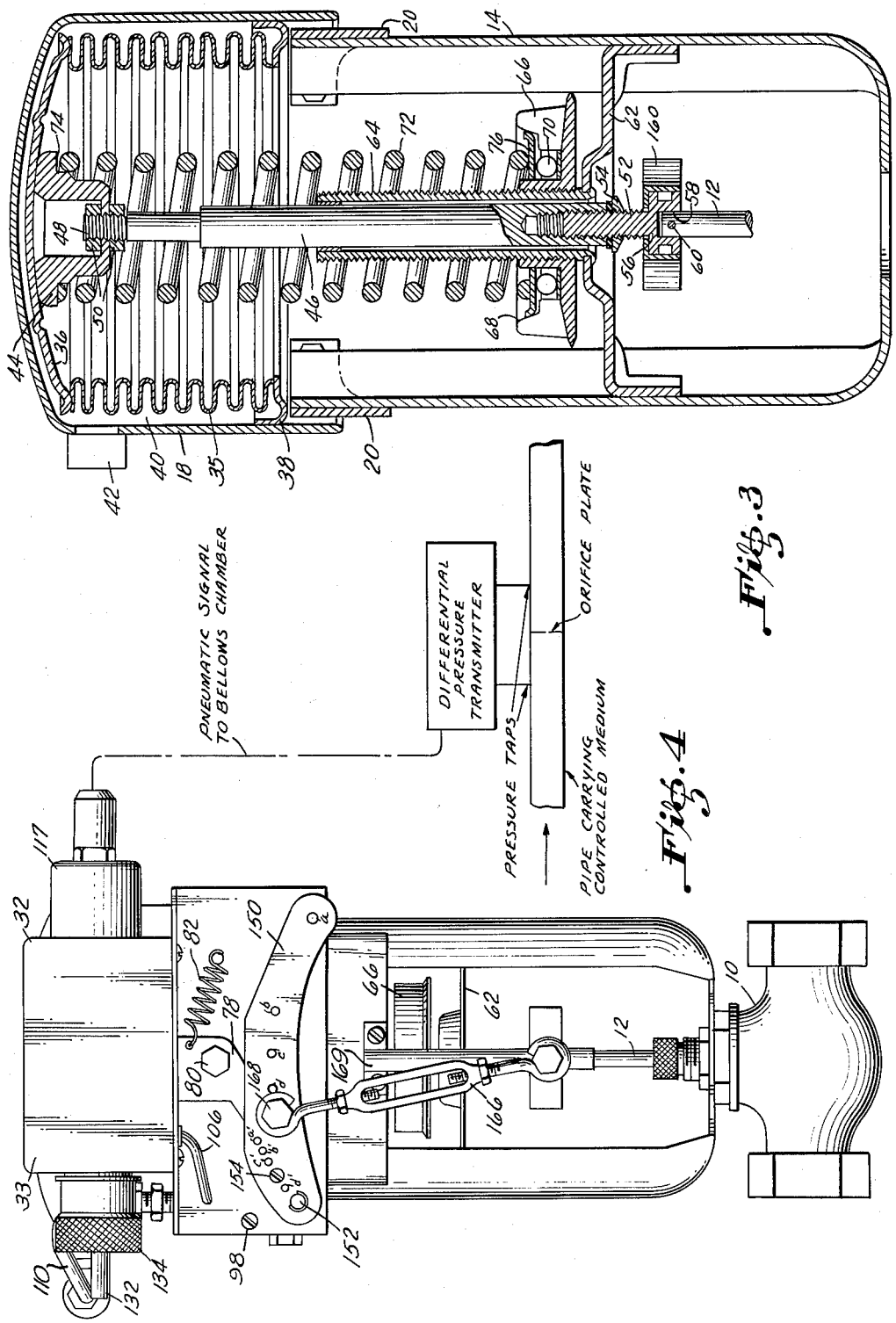

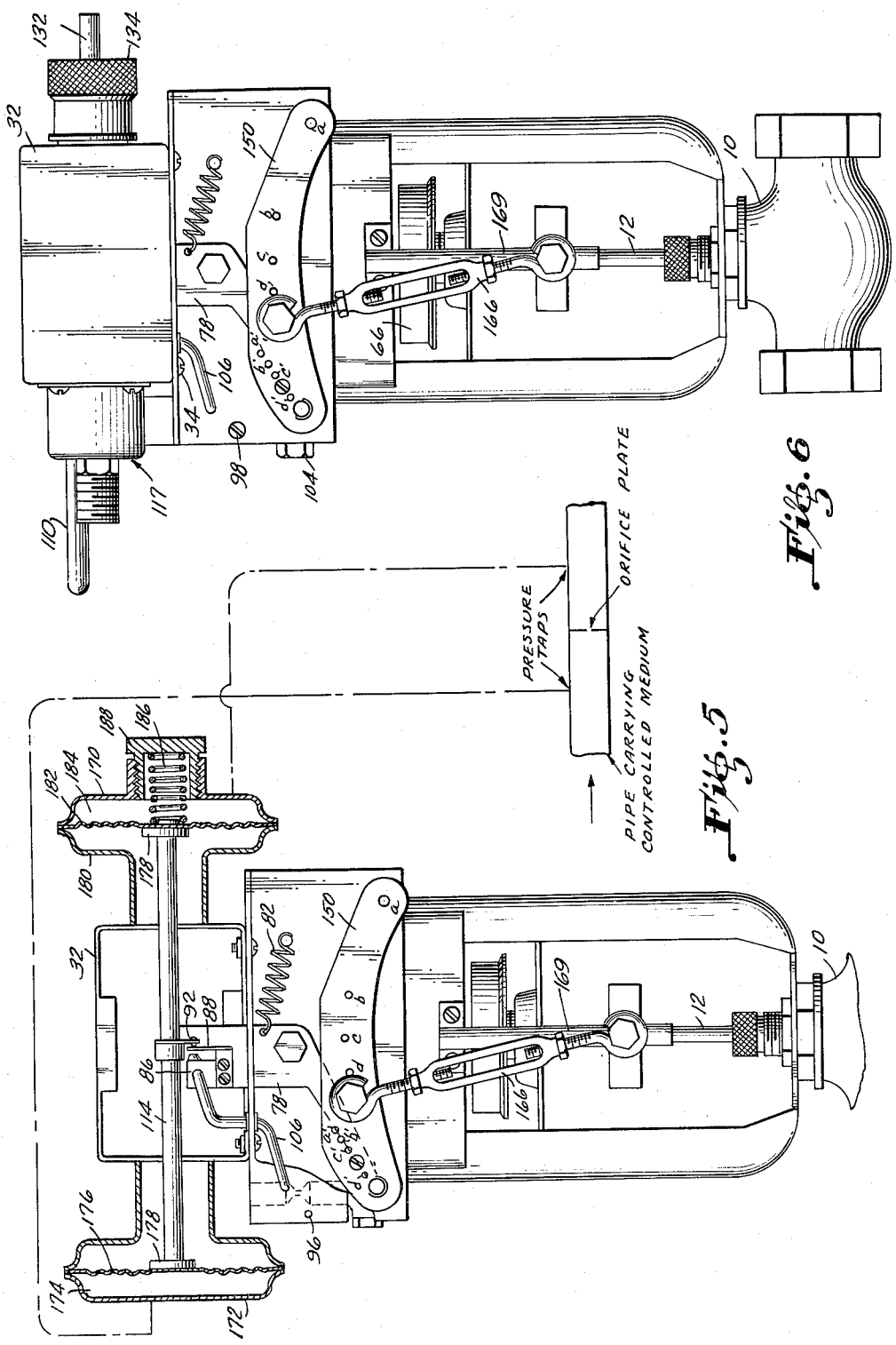

2,989,034
COMBINATION POSITIONER AND CONTROLLER
Louis M. Puster, Knoxville, Tenn., assignor to Robertshaw-Fulton Controls Company, Richmond, Va., a corporation of Delaware
Filed May 18, 1959, Ser. No. 813,967
8 Claims. (Cl. 121—41)

This invention relates to combination positioners and controllers and more particularly to those types in which a pneumatic controller actuates a positioner to cause an operation whereby a final control element, such as a valve, is moved to a position substantially proportional to the magnitude of a measured variable, in response to deviations of a measured variable from a set point.

It is an object of this invention to allow the combination positioner and controller to be adjusted for varying the set point, the proportional band, and for accommodation to the lift of the final control element being used.

Another object of this invention is to permit the controller to be reversed between direct-acting and reverse-acting movement by allowing a simple reversal of parts.

Another object of this invention is to combine a controller and a positioner to eliminate a considerable number of parts, which are necessary if the positioner and controller are not combined, by mounting the controller and the positioner on the frame of the final control element.

In accordance with one feature of this invention, a primary measuring element, such as a pressure thermometer or differential flow meter, actuates a flapper actuator which in turn causes a flapper to move relative to a nozzle to regulate the pressure within a pressure operated actuator. This actuator in turn controls the position of the final control element. A feedback linkage is connected to a portion of the actuator and includes a bell crank lever upon which the nozzle and flapper are mounted so that a change in the measured variable actuates the flapper-nozzle to cause the pressure operated actuator to move the final control element. This movement in turn drives the feedback linkage to reposition the nozzle-flapper in order that the position of the final control element is proportional to the magnitude, within limits, of the measured variable.

In accordance with another feature of this invention, the flapper actuator is mounted upon an axially movable rod which is supported in an enclosure. This enclosure is supported upon a frame member by a pair of mounting screws which are removable to allow the enclosure and flapper actuator to be reversed whereby the action of the flapper-nozzle is changed between direct-acting and reverse-acting movement.

In accordance with still another feature of this invention, the feedback linkage contains a first lever which is provided with a first series of holes for adjusting the proportional band and which is provided with second series of holes for stepped adjustment of the lift setting. A pin extends through the second series of holes to engage the bell crank to actuate the same in one direction.

Other objects and advantages of this invention will be apparent from the following description taken in connection with the accompanying drawings in which:

FIG. 3 is a cross sectional view on an enlarged scale taken along reference lines 3—3 of FIG. 2;

FIG. 4 is a front elevational view, somewhat schematic, of another embodiment of this invention;

FIG. 5 is a front elevational view, with portions in sections and other portions broken away, of still another embodiment of this invention; and FIG. 6 is a front elevational view of a feature of this invention shown in FIG. 1.

Figures 1, 2:
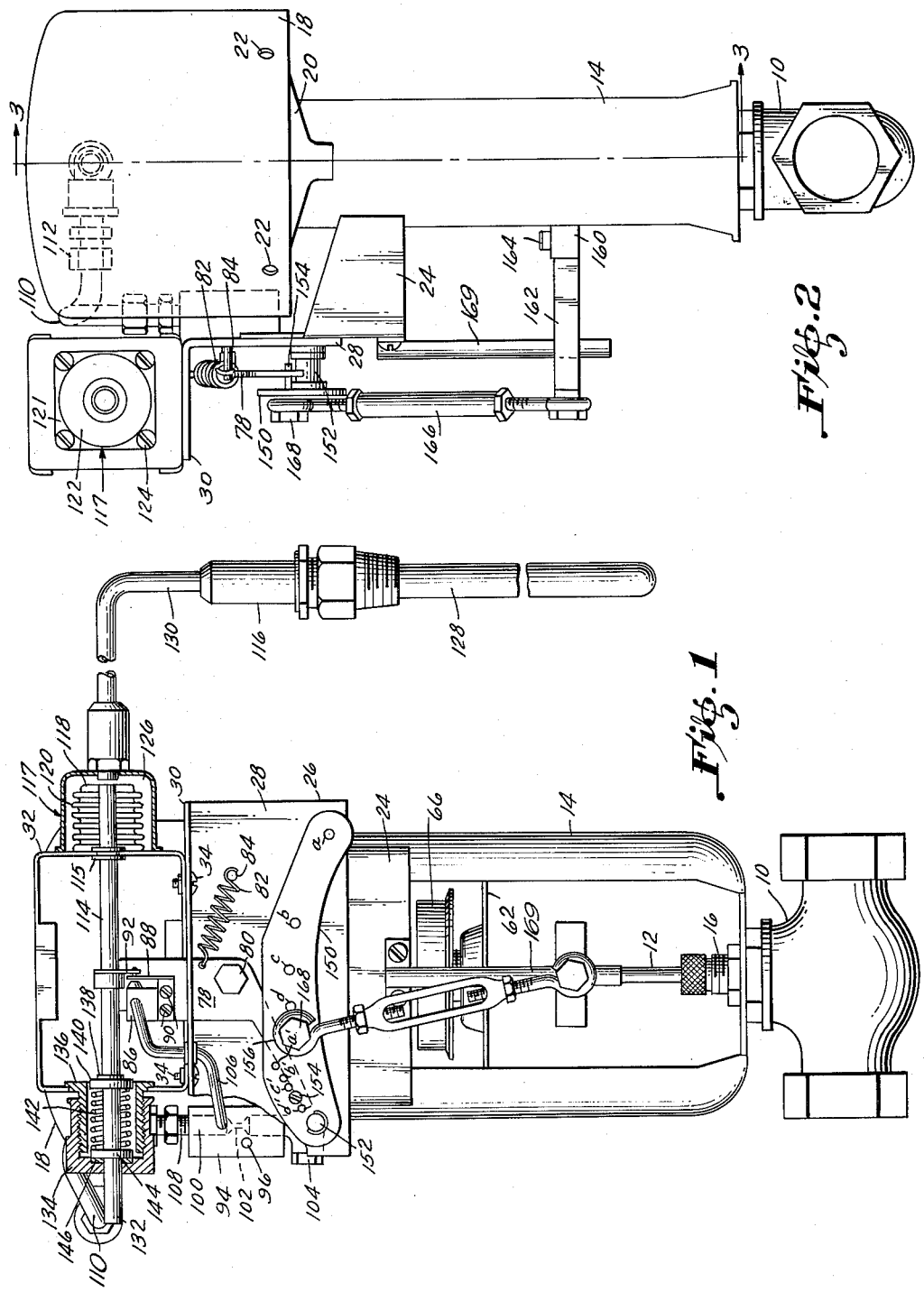
FIG. 1 is a front elevational view, with parts in section and portions broken away, of an embodiment of this invention.
FIG. 2 is a side elevational view of the device shown in FIG. 1.

Referring now to the drawings, and more particularly to FIGS. 1 and 2, a final control element is shown comprising a valve 10 which is adapted to be connected to a flow line through which a control agent passes. Valve 10 may be any well known direct-acting or reverse-acting valve of the type in which the flow of the control agent is controlled in response to movement of a valve stem 12 which extends exteriorly of the casing of valve 10.

A generally U-shaped frame 14 is mounted upon valve 10 by connecting means 16 through which valve stem 12 slidably extends. An inverted cup-shaped cap 18 is connected to a pair of mounting brackets 20 by a plurality of screws 22. Bracket 20 is connected to frame 14 by welding or other suitable means.

The arms of a U-shaped bracket 24 are welded or otherwise connected to the legs of frame 14. A support plate 26 is provided with a vertical plate 28 that is welded or otherwise suitably connected to bracket 24, and a base plate 30. A generally five-sided enclosure or housing 32, open at the front side, is connected to base plate 30 by a plurality of nut and bolt assemblies 34. It is preferable, although not necessary, that the open side of housing 32 be covered with a removable plate 33 (FIG. 4) which may be inscribed with suitable information for operation of this device.

As best shown in FIG. 3, pressure operated actuating means for moving valve stem 12 includes an expansible and collapsible corrugated tubular wall or bellows 35 interiorly disposed within cap 18 and hermetically sealed at its opposite ends to a movable end wall 36 and a stationary annulus 38 interiorly sealed to the wall of cap 18 adjacent the open end thereof. Cap 18, bellows 35, end wall 36, and annulus 38 define a chamber 40 which is connected to a source of pressurized fluid through a chamber inlet 42.

Motion transmitting means are connected between end wall 36 and valve stem 12 and include a driven member 44, the upper surface of which abuts end wall 36. A rod 46 is formed with an exteriorly threaded end 48 which is connected to member 44 by a pair of lock nuts 50. The opposite end of rod 44 is interiorly threaded to receive the threaded shank of a bolt 52. A lock nut and washer assembly 54 prevent accidental separation of bolt 52 and rod 46. Bolt head 56 is formed with a socket 58 which encloses the upper end of valve stem 12. A pin 60 secures stem 12 to bolt head 56.

A support plate 62 is connected at opposite ends to frame 14 and extends between the legs thereof. An exteriorly threaded tubular member 64 is connected at one end to plate 62 and is disposed coaxially with, but spaced from, a portion of rod 46. An adjusting nut 66 is rotatably mounted on a lower portion of member 64 and is formed with an annular groove 68 in which a thrust ball bearing 70 is positioned. A helical compression spring 72 is provided with flat-faced ends which abut the under surface of flange 74 of member 44 and the upper thrust plate 76 of bearing 70. Rotation of nut 66 changes the biasing force of spring 72 and allows the actuating means to be adjustable to pneumatic supplies of different pressures.

A first lever in the form of a bell crank 78 is pivotally mounted on a bolt 80 connected to plate 28. A helical tension spring 82 is connected at opposite ends to a stationary rod 84, which extends perpendicularly from plate 28, and bell crank 78 for biasing the same in a clockwise direction as viewed in FIG. 1. A nozzle 86 and a flapper 88 are mounted on bell crank 78 by means of a plurality of screws 90. A flapper actuator 92 is positioned adjacent flapper 88.

A block 94 is provided with a threaded hole 96 into which one end of a screw 98 is threaded. Screw 98 passes through plate 28 for mounting block 94 thereon. Block 94 is formed with a passage 100 which extends between opposite surfaces and is formed with a restrictor 102 in the middle. The upstream end of passage 100 is adapted to be connected to a pressurized source of air through an elbow inlet 104. Downstream from restrictor 102, passage 100 is formed with a pair of outlets, one of which is connected through flexible tubing 106 to nozzle 86. The other outlet is connected through a double-threaded end connector 108 to a conduit 110 which is in turn connected to chamber inlet 42 through a connector 112. Tube 106 extends from block 94 and passes through an aperture formed in plate 28 and through a grommet positioned in base plate 30. By making the diameter of nozzle 86 larger than the diameter of restrictor 102, the downstream pressure is essentially atmospheric when nozzle 86 is uncovered.

Flapper actuator 92 extends downwardly from and is connected to a rod 114 which is slidably disposed within housing 32. In the embodiment of this invention illustrated in FIG. 1, movement of rod 114 and flapper 92 is controlled by a pressure thermometer 116. One end of rod 114 passes through a grommet 115 mounted in end wall of housing 32 and terminates in a bellows assembly 117. Rod 114 abuts a movable end wall 118 which is hermetically sealed to one end of an expansible and collapsible bellows 120. The other end of bellows 120 is hermetically sealed to a base plate 121 which is in turn hermetically sealed to a cap 22 which encloses bellows 120. Cap 122 and bellows 120 are connected to housing 32 by a plurality of screws 124.

Bellows 120, end plate 121, cap 122 define a pressure chamber 126 which communicates with the interior of a temperature sensing bulb 128 through a tube 130. Pressure thermometer 116 may be of any well known type and is filled with a temperature sensitive fluid which expands and contracts in response to changes in temperature.

End 132 of rod 114 passes through the other side of housing 32 and through a suitably formed aperture in the end wall of a control knob 134 rotatably mounted on an exteriorly threaded tubular member 136 connected to housing 32. Rod 114 is provided with an integral annular flange 138 against which an annulus 140 is biased by a helical compression spring 142. Another annulus 144 is positioned adjacent to an annular washer 146 which is positioned in an annular groove formed in the end wall of control knob 134. Spring 142 abuts and tends to bias apart annuli 140 and 144. It should also be noted that spring 142 biases rod 114 into engagement with end wall 118.

It will be obvious that the pressure within chamber 126 creates a force on end wall 118 directly proportional to the temperature. This force is opposed by spring 142 acting through rod 114. By rotating knob 134, the compression of spring 142 is changed causing the force balance to occur at a slightly different position of rod 114 and flapper actuator 92. Knob 134 provides, in effect, adjustable means for varying the set point.

A second lever 150 is pivotally mounted on a pivot 152 which is connected to plate 28 by suitable means, as for example by threading one end of pivot 152 into plate 28. Lever 150 is provided with a first series of holes a, b, c, d, etc., and a second series of holes a', b', c', d', etc. A threaded pin 154 is adapted to be inserted in any of the holes a', b', c', d', etc., wherein pin 154 extends rearwardly from lever 150 and abuts the top surface of arm 156 of bell crank 78.

A trapezoidal plate 160 has a pair of depending side walls connected to the non-parallel edges thereof. Bolt 52 is inserted through a hole formed in plate 160 and is rigidly connected thereto. A U-shaped channel 162 is connected at one end to plate 160 by at least one, and preferably two, screws 164. The outer end of channel 162 is bent over and a turnbuckle assembly 166 is connected thereto. The other end of turnbuckle assembly 166 is provided with a bolt 168 which is adapted to be inserted in any one of a series of holes a, b, c, d, etc. A guide 169 having a C-shaped cross section is connected at one end to the support and has the other end extending through a suitably formed aperture to guide movement of channel 162.

This invention may readily be applied to systems in which the measured variable is a flow of fluid rather than temperature. As shown in FIG. 4, a differential flow meter is connected with a pair of pressure taps on either side of an orifice plate installed in the pipe carrying the controlled medium. The differential pressure created across the orifice plate is different for each rate of flow. By connecting the pressure taps to a differential pressure transmitter, the resultant signal may be transmitted to bellows assembly 117 to cause actuation of flapper actuator 92.

Alternatively, as illustrated in FIG. 5, the pressure taps on either side of the orifice plate may be connected to a pair of opposed diaphragm assemblies 170 and 172. Diaphragm assembly 172 is provided with an expansible chamber 174 into which the pressure from one side of the orifice plate is transmitted to cause movement of a movable diaphragm 176. In this case, rod 114 is modified slightly and is provided with a pair of disc members 178 on both ends thereof.

Diaphragm assembly 170 is provided with a casing structure 180, which is connected to housing 32, and is provided with a movable diaphragm 182 that abuts disc 178 and an expansible chamber 184 into which pressure from the other side of the orifice plate is transmitted. A helical compression spring 186 is disposed within chamber 184 and has one end abutting diaphragm 182 and has the other end disposed within a socket formed in a control knob 188 which is threadably received in casing 180.

In operation, elbow 104 is connected to a pressurized pneumatic supply which provides air at a constant pressure. Air flows through passage 100 and restrictor 102 to nozzle 86. The operation of the nozzle 86 and the flapper 88 is well known. When flapper 88 is positioned a small distance away from nozzle 86, air flows through nozzle 86 and is exhausted to atmosphere. The pressure downstream from restrictor 102 is therefore atmospheric and the pressure in chamber 40 is also atmospheric. As flapper 88 moves towards nozzle 86, the flow of air is restricted with the resultant increase in back pressure which causes the pressure in chamber 40 to increase. The amount of movement of flapper 88 necessary for control purposes is very small, within the range of .005" to .010", so that the movement of flapper actuator 92 and rod 114 necessary for control purposes is relatively small.

As the temperature of bulb 128 increases above the lower limit of the controlled temperature range, the pressure of the temperature sensitive fluid increases thus causing bellows 120 to collapse slightly whereupon end wall 118 moves rod 114 to the left, as viewed in FIG. 1, against the bias of spring 142. The resultant movement of flapper actuator 92 moves flapper 88 towards nozzle 86 to restrict the flow of air therefrom and to cause an increase in the back pressure. The increased back pressure is transmitted to chamber 40 and acts upon bellows 35 to move end wall 36 downwardly as viewed in FIG. 3. This resultant downward movement is transmitted through member 44 to cause rod 46, bolt 52 and valve stem 12 to move downwardly to restrict the flow through valve 10. The downward movement of member 44 and valve stem 12 is opposed by the bias of spring 72. This downward movement also causes channel 162 and turnbuckle assembly 166 to move downwardly causing bolt 168 to pivot lever 150 in a clockwise direction as viewed in FIG. 1 about pivot 152. Rotation of lever 150 causes pin 154 to rotate bell crank 78 against the bias of spring 82 in a counterclockwise direction causing nozzle 86 and flapper 88 to move away from flapper actuator 92 with a resultant decrease in the amount of the restriction of the airflow through nozzle 86.

The resultant decrease in back pressure allows spring 72 to move valve stem 12 upwardly thereby moving turnbuckle assembly 166, rotating lever 150 in a counterclockwise direction and rotating bell crank 78 in a clockwise direction under the bias of spring 82. This movement in turn causes flapper 88 to move towards flapper actuator 92 and thereby restrict the flow from nozzle 86. This action continues until the amount of restriction of the air flowing from the nozzle 86 is balanced and the position of valve stem 12 corresponds to the temperature of the bulb 128 to provide proportional control of flow through valve 10. If the temperature of bulb 128 increases above the upper limit of the controlled temperature range, flapper actuator 92 causes flapper 88 to fully close nozzle 86 so that the resultant back pressure is sufficient to move valve stem 12 to a fully closed position. When operating at or near the set point, changes in the measured variable actuate valve 10 to reposition it to alter the value of the measured variable in an opposite direction from that of the original change.

When bellows assembly 117 is connected to a differential flow meter, as illustrated in FIG. 4, the action of this device is similar to that described above. In the embodiment shown in FIG. 5, the high pressure tap is admitted to chamber 174 to cause rod 114 to move against the bias of spring 186. Control knob 188 is so adjusted that the forces caused by the pressure acting within chambers 170 and 174 and the force of spring 186 positions flapper actuator 92 adjacent flapper 88 to control the flow through valve 10.

To reverse the action of the controller, it is merely necessary to remove mounting screws 34, turn housing 32 through 180° and replace screws 34. In such a case, with reference to FIG. 1, the flapper actuator 92 will be so positioned as to cause flapper 88 to move towards nozzle 86 in response to decreases of temperature of bulb 128 rather than in response to increases in the temperature as would be the case when the controller is not reversed.

This invention is readily adaptable to be connected to various valves which have different valve lifts between fully open and fully closed positions. By changing the position of screw 154 between any of the holes $a'$, $b'$, $c'$, $d'$, etc., the amount of the valve lift will be correspondingly changed. The proportional band of the controller may be also adjusted by changing the position of bolt 168 between any of the holes, $a$, $b$, $c$, $d$, etc. Mechanically, this proportional band adjustment serves the same purpose as the lift adjustment in that it provides for an adjustment of the lever ratios existing between valve stem 12 and nozzle 86. However, the two adjustments are separate so that the proportional band will be the same at a given proportional band setting regardless of valve size or valve lift.

It will be obvious that the feedback further provides for positive positioning of valve 10 for a specific value of the measured variable in the presence of varying forces acting on valve 10 due to the pressure of the controlled medium acting within valve 10. If a change occurs in this internal force, nozzle 86 is repositioned in such a manner as to change the pressure within actuator chamber 40 to move valve stem 12 to counteract the thrust change within valve 10.

Faster response to a change in the measured variable may be accomplished by the addition of a pneumatic relay (not shown) to the device. With the addition of the relay, the output pressure of the nozzle-flapper combination would become the relay control signal. With such a relay, the volume of air entering the chamber 40 of the actuating means would not be limited by the size of restrictor 102.

It will be apparent to those skilled in the art that many changes may be made in the arrangement of parts without departing from the scope of this invention as defined in the appended claims.

I claim:

1. In a control system for positioning a control stem, the combination comprising a sensing element responsive to a measured variable, a bellows connected to said sensing element and being movable in response to changes in said variable, a flapper actuator operatively connected for movement with said bellows, a nozzle, a restrictor orifice connected to said nozzle for limiting a flow of fluid thereto, said restrictor orifice being adapted to be connected to a pneumatic supply, a flapper disposed adjacent to said nozzle for controlling a flow of fluid therethrough and being engageable with said flapper actuator for movement relative to said nozzle, pressure responsive means adapted to be connected to the control stem for moving the same in one direction, biasing means adapted to be connected to the control stem for moving the same in another direction, said pressure responsive means being connected to said restrictor orifice for moving the control stem in response to changes in pressure downstream from said restrictor orifice, and feedback means including a first lever adapted to be operatively connected to the control stem for movement therewith and a second lever biased in one direction and being operatively connected to said first lever, said nozzle and said flapper being mounted upon said second lever for movement therewith whereby changes in the measured variable moves the control stem to a position proportional to the magnitude of the measured variable.

2. In a control system, the combination comprising a stem element for a control device, a first lever means, biasing means for pivoting said first lever means in one direction, a nozzle mounted upon said first lever means, a flapper mounted upon said first lever means and being movable relative to said nozzle for restricting flow of fluid therefrom, second lever means for moving said first lever means in one direction against the bias of said biasing means and for controlling the movement of said first lever means in the other direction, a flapper actuator positioned adjacent to and being engageable with said flapper for moving the same relative to said nozzle, means responsive to a measured variable operatively connected for moving said flapper actuator between positions in response to changes in said measured variable, and a control stem movable between positions and being operatively connected to said second lever means to move the same in accordance with the position of said control stem.

3. In a controlled system for maintaining a measured variable relatively constant within limits and having a control element adapted to regulate the measured variable, the combination comprising: a pressure operated actuator adapted to be connected to the control element for moving the same between positions, controller means for regulating the pressure within said actuator and including a nozzle, a flapper movable relative to said nozzle, and a fluid line connected to said nozzle and said actuator and adapted to be connected to a pressurized fluid supply, measuring means for actuating said controller and including a primary measuring element responsive to the measured variable and a flapper actuator operatively connected to said measuring element and disposed adjacent said flapper, said flapper actuator being engageable with said flapper for moving it relative to said nozzle in response to changes in the measured variable to vary the pressure within said pressure operated actuator to move the control element between positions, a first lever, said flapper and said nozzle being mounted on said first lever for movement therewith relative to said flapper actuator, and a second lever operably connected for movement with the control element and being engageable with said first lever for moving said flapper relative to said flapper actuator to move the control element to a position proportional to the magnitude of the measured variable.

4. The device of claim 3 wherein said second lever is further provided with first stepped adjustment means to vary the proportional band of the controlled system.

5. The device of claim 4 wherein said second lever is further provided with second stepped adjustment means for accommodation to the lift of the control element.

6. In a controlled system for maintaining a measured variable relatively constant within limits and having a positioner stem adapted to regulate the measured variable, the combination comprising: a pressure operated actuator adapted to be connected to the positioner stem for moving the same between positions, controller means for regulating the pressure within said actuator and including a nozzle, a flapper movable relative to said nozzle, and a fluid line connected to said nozzle and said actuator and adapted to be connected to a pressurized fluid supply, pressure operated measuring means including a bellows assembly having a wall movable in response to changes in the value of the measured variable, a movable rod connected at one end to said wall, biasing means connected to the other end of said rod, adjustment means connected to said biasing means to vary the set point, and a flapper actuator mounted on said rod for movement therewith, said flapper actuator being engageable with said flapper for moving it relative to said nozzle in response to changes in the measured variable to vary the pressure within said pressure operated actuator to move the positioner stem between positions, a first lever, said flapper and said nozzle being mounted on said first lever for movement therewith relative to said flapper actuator, and a second lever operably connected for movement with the positioner stem and being engageable with said first lever for moving said flapper relative to said flapper actuator to move the positioner stem to a position proportional to the magnitude of the measured variable.

7. The device of claim 6 including an enclosure, said rod being mounted for longitudinal movement in said enclosure, and detachable mounting means connected to said enclosure to permit said enclosure and said flapper actuator to be reversed to change said controlling means between direct-acting and reverse-acting movement.

8. In a controlled system for maintaining a measured variable relatively constant and having a positioner stem adapted to regulate the measured variable, the combination comprising: a support frame adapted to extend in the same direction as the positioner stem, a pressure operated bellows actuator mounted on said frame and being adapted to be connected to the positioner stem for moving the same between positions, a support plate including vertical and horizontal portions connected to said frame whereby said vertical portion is displaced from the axis of the positioner stem, an enclosure mounted on said horizontal portion, a driven member slidably disposed within said enclosure, adjustable biasing means mounted on one side of said enclosure and being engageable with said driven member for moving the same in one direction, a pressure operated bellows assembly mounted on the opposed sides of said enclosure and being engageable with the other end of said driven member for moving the same in the other direction against the bias of said biasing means, measuring means operably connected to said bellows assembly to move said driven member in response to changes in the measured variable, a bell crank pivotally mounted on the vertical portion of said support plate, one end of said bell crank extending into said enclosure, a nozzle, a flapper movable relative to said nozzle, said nozzle and said flapper being mounted on the end of said bell crank within said enclosure, a block formed with a restricted passage adapted to be connected to a pressurized pneumatic supply, said nozzle and said bellows actuator being connected to said passage downstream from the restricted portion, a flapper actuator mounted on said driven member for moving said flapper relative to said nozzle in response to changes in the measured variable to vary the pressure in said bellows actuator and move the positioner stem to alter the value of the measured variable in an opposite direction from that of the original change, a lever pivotally mounted on the vertical portion of said plate and including a projection which abuttingly engages the other end of said bell crank for moving the same, and linkage means interconnecting said lever and the positioner stem to move said nozzle and said flapper to vary the pressure within said bellows actuator to position the positioner stem an amount substantially proportional to the magnitude of the measured variable.

References Cited in the file of this patent
UNITED STATES PATENTS

| | | |
|---|---|---|
| 2,298,112 | Edwards et al. | Oct. 6, 1942 |
| 2,789,543 | Popowsky | Apr. 23, 1957 |
| 2,873,755 | Whitehead | Feb. 17, 1959 |